No Printed Specification Available
8669X
J. Ball.
Compass.
Patented Mar. 6, 1835.
Section of Compass
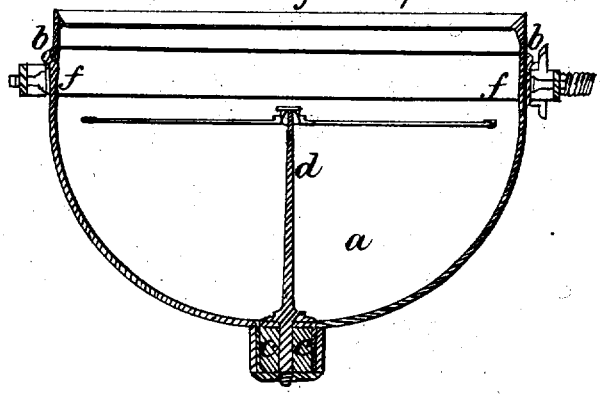
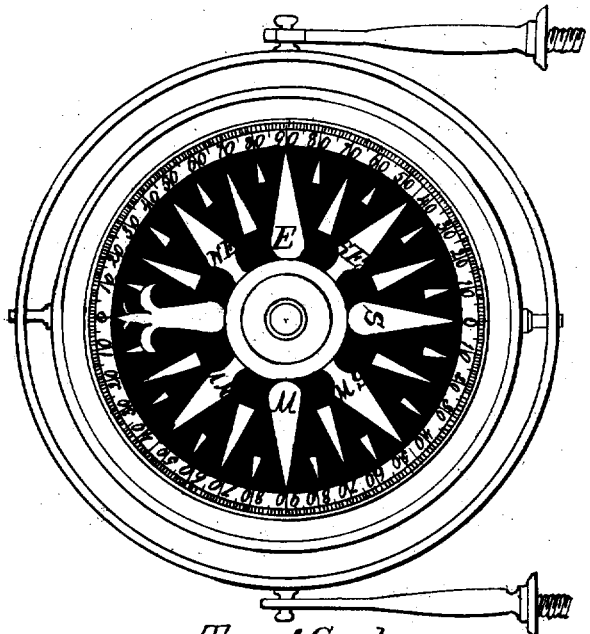
Top of Card
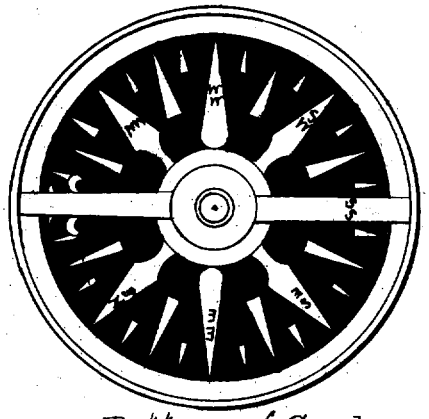
Bottom of Card
N. PETERS, PHOTO-LITHOGRAPHER, WASHINGTON, D. C.

8667X

Mar. 6. 1835

Jonathan Ball of Buffaloe, county of Erie State of Newyork –

Letters Patent –

The schedule referred to in these Letters Patent and making part of the same containing a description in the words of Jonathan Ball himself of his improvement in the Mariner's Compass.

To all, to whom these Presents shall come. Be it known, that I Jonathan Ball of Buffaloe in the county of Erie and state of New-york have invented a new and useful improvement in the Mariner's Compass, and that the following is a full and exact description of the construction & operation of my improvement as invented or discovered by me –

A hollow hemisphere of Glass is to be formed of sufficient thickness to resist the ordinary accidents of breakage – On the outside at about half an inch below the top edge a projection or rim is formed running all around & the bottom terminates in a small hollow neck or tube of about half an inch in length projecting from the surface and about three quarters of an inch in diameter – Through this opening the Pental or centre point on which the needle plays, is to be inserted and is to be thus secured; a thread is to be cut on the end to be fastened, extending to a small distance above the inner surface of the hemisphere, to this point a nut is to be screwed and under it is placed on a washer or plate of brass of sufficient circumference to cover the opening & rest upon the sides of the interior, upon this is forced a cork so as to effectually close the opening, & beneath this another circular plate equal in circumference to that of the outside of the tube, and finally another wut which by being screwed tight, holds the pental securely erect and effectually closes the opening – Beneath the projection or rim on the outside is secured a brass hoop fitting the circumference of the glass so closely that it cannot pass over the rim; on opposite points of the diameter of this are projecting points serving as the axis on which this circle revolves within another in the usual manner of hinging the mariner's compass. On the pental or

[illegible]

centre point is to be hung in the usual way the card, which card I construct in the following manner.... The points are laid down as usual and the outside graduated on the circle in the common way, but my object is to render my card transparent which I effect thus - The letters designating the different points North, South, East, West, - North East, North West South, East & South West are to be marked in strong black lines in the widest part of an open pointed space left white for that purpose, the remaining points are also designated by smaller white spaces - The whole of the surface circumscribing these spaces & within the outer circle of graduation is made black - Another card is now prepared with the pointed spaces made exactly to correspond with those of the first & without the graduated circle, but in this, the letters designating the aforementioned points are to be left white one on each side of the pointed open space, but the situations of these letters except for the North and south will be necessarily reversed in position on the face of this prepared card, that is the East will be on the left hand and the West on the right & so of the others. In order to be in their proper positions, when affixed to the under side of the first described card, the spaces around these open or white points and letters will be black, so that when the two are fastened accurately together, point to point, the black parts will be opake and the white rendered transparent by the following process or mode for that intent. A coat of varnish is to be spread on the back of each card, and previous to applying them together a small piece of white paper sufficiently large to cover each of the white letters is to be adjusted to each one on the last described card the cards are now stuck together having the inscribed surfaces exposed and other coats of varnish may be applied as often as found requisite, to render them transparent where so required Previous to sticking them together, a plan to keep them stiff and smooth in the plane of their circumference may be here employed, that is to insert or affix between a thin sheet of the fossil called Isinglass stone, which is a transparent substance, or another mode wil [illegible] to secure round the edge of the circumference a thin [illegible] rim or edge of brass – This card, thus prepared is to be
secured in the proper position of polarity into the needle, & which is
thus effected – The center of the needle or magnet is flattened horizontally
having a hole through the centre sufficiently large & cut with a thread
to admit a [illegible] or hollow cone, having the base cut with a like thread
on the outside to screw into said hole in the needle, the top of this
cone is armed in the usual manner for the play of the needle –

This is the principle on which I construct my improvement, the mode
of applying this principle is as follows –

The Hemisphere of Glass is to be supported in any manner most con-
venient to [illegible] as much as possible of the under part of the card by those
below or in the cabin, the manner I prefer is to secure a pair of rect-
angular arms at the back part of the roof or enclosure of the companion
way: in a [illegible] on the extremity of the projecting arms of which the
pivots of the outside circle in which the compass swings are to revolve
There is to be an opening at this part of the companion way so as
to give the helmsman a free inspection of the card, which he will obtain
distinctly by means of the transparency given to it from the free
passage of the light through the hemisphere coming from the cabin
below. It will also serve to indicate to those below it or in the Cabin
the [illegible] information by means of the white letters on the under
side in this way it tells its own tale correctly and thereby super-
sedes the necessity of the additional compass as hung below for that
purpose in common use – The saving of the binnacle light which
in this [illegible] is dispensed with as well as the warm and dry air of
the cabin below by which the compass is surrounded form items
of economy and use daily to be appreciated by every seaman –

What I claim as my own invention and not previously
known in the above described machine is the improvement I effect
by means of the principle therein adopted of rendering the card
on both sides equally visible as well from above as below by means
of the hemisphere of Glass, the parts of which improvement consist
First in the application of the Hemisphere of Glass – Secondly,

8664X in rendering the underside of the card as distinctly legible and capable of communicating the desired information of the course steered, as is to be obtained from above & thereby serving instead of the tell tale compass as heretofore used, which is effected by the addition of the lower card as described –

In testimony that the above is a full clear and exact description of the construction and application of the principle of my improvement as invented or discovered by me, I have hereunto set my hand this fourteenth day of Feb'y. Eighteen Hundred and Thirty five –

Witnesses
C. H. W. Wharton
Henry Stone

Jonathan Ball –

Drawing made

E.T. W.H.

(1404 words)